United States Patent [19]
Waller, Jr.

[11] Patent Number: 5,962,544
[45] Date of Patent: Oct. 5, 1999

[54] MICROPOROUS MATERIALS OF ETHYLENE-VINYL ALCOHOL COPOLYMER AND METHODS FOR MAKING SAME

[75] Inventor: Clinton P. Waller, Jr., White Bear Lake, Minn.

[73] Assignee: 3M, St. Paul, Minn.

[21] Appl. No.: 08/568,808

[22] Filed: Dec. 7, 1995

[51] Int. Cl.$^6$ ....................................................... C08F 16/06
[52] U.S. Cl. ............................... 521/141; 521/61; 521/64; 521/134; 521/142; 428/315.5; 428/461; 428/500
[58] Field of Search ............................. 521/61, 134, 142, 521/64, 141; 428/315.5, 461, 500

[56] References Cited

U.S. PATENT DOCUMENTS

| | | | |
|---|---|---|---|
| 3,839,516 | 10/1974 | Williams et al. | 264/41 |
| 4,134,837 | 1/1979 | Yamashita . | |
| 4,220,543 | 9/1980 | Yamishita . | |
| 4,317,729 | 3/1982 | Yamashita et al. . | |
| 4,402,940 | 9/1983 | Nose et al. | 424/101 |
| 4,539,256 | 9/1985 | Shipman | 428/315.5 |
| 4,863,792 | 9/1989 | Mrozinski | 428/315.5 |
| 4,968,733 | 11/1990 | Muller et al. | 521/64 |
| 5,120,594 | 6/1992 | Mrozinski | 428/195 |
| 5,443,727 | 8/1995 | Gagnon . | |

FOREIGN PATENT DOCUMENTS

| | | |
|---|---|---|
| 0 203 459 | 12/1986 | European Pat. Off. . |
| 0273582 | 7/1988 | European Pat. Off. . |
| 0357021 | 3/1990 | European Pat. Off. . |

*Primary Examiner*—John M. Cooney, Jr.
*Attorney, Agent, or Firm*—Gary L. Griswold; Douglas B. Little; Roger R. Tamte

[57] ABSTRACT

A microporous shaped article is provided. The article comprises ethylene-vinyl alcohol copolymer which has an internal structure of a multiplicity of spaced, randomly dispersed, non-uniform shaped particles of ethylene-vinyl alcohol copolymer. Also provide is process for preparing microporous shaped articles comprising the steps of: (a) melt blending to form a mixture comprising ethylene-vinyl alcohol copolymer and a compatible polymer or compound in which the copolymer will dissolve to form a solution at the melting temperature of the copolymer, but will phase separate on cooling at or below the crystallization temperature of the ethylene-vinyl alcohol copolymer; (b) forming a shaped article of the melt blended mixture; (c) cooling the shaped article to a temperature to cause phase separation to occur between the compatible copolymer or compound and the ethylene-vinyl alcohol copolymer, thereby providing an article comprising an aggregate of a first phase comprising particles of ethylene-vinyl alcohol copolymer in a second phase comprising the compatible polymer or compound with adjacent ethylene-vinyl alcohol copolymer particles being distinct but having a plurality of zones of continuity; and (d)i) collecting said article which has adjacent ethylene-vinyl alcohol copolymer particles which form a network of interconnected micropores therebetween, or ii) extracting the compatible polymer or compound with water and stretching the shaped article in at least one direction while wet to further separate adjacent ethylene-vinyl alcohol copolymer particles from one another and to permanently attenuate the ethylene-vinyl alcohol copolymer in the zones of continuity to form fibrils therebetween and drying, or iii) extracting the compatible polymer or compound with an organic solvent, and optionally stretching.

17 Claims, 6 Drawing Sheets

MICROPOROUS MATERIALS OF ETHYLENE-VINYL ALCOHOL COPOLYMER AND METHODS FOR MAKING SAME

THE FIELD OF THE INVENTION

The present invention relates to microporous materials, and in particular, to microporous materials formed of an ethylene-vinyl alcohol copolymer and methods for making the same.

BACKGROUND OF THE INVENTION

Microporous films or membranes have a structure that enables fluids to flow through them or into them. The effective pore size is at least several times the mean free path of the flowing molecules, namely, from several micrometers down to about 100 Angstroms. Such sheets are generally opaque, even when made from an originally transparent material, because the surfaces and internal structure scatter visible light.

Microporous membranes or films have been utilized in a wide variety of applications, such as for the filtration of solids, for the ultrafiltration of colloidal matter, as diffusion barriers or separators in electrochemical cells, in the preparation of synthetic leather, and in the preparation of cloth laminates. The latter utilities require, of course, permeability to water vapor but not liquid water when preparing such materials as synthetic shoes, raincoats, outer wear, camping equipment such as tents, and the like. Moreover, microporous membranes or films are often utilized for microfiltration of antibiotics, beer, oils, bacteriological broths, as well as for the analysis of air, microbiological samples, intravenous fluids, vaccines, and the like. Microporous membranes or films are also utilized in the preparation of surgical dressings, bandages, and in other fluid or gas transmissive medical applications.

Microporous membranes or films may be laminated to other articles to make laminates having particular utility. Laminates are often used to provide enhanced mechanical strength or specific aesthetic character. Such laminations may include a microporous layer and an outer shell layer to provide a particularly useful garment material. Laminates including a microporous layer also have utility as imaging substrates.

Microporous membranes or films of crystallizable thermoplastic polymers such as, for example, polyolefins, polyesters and polyamides, have been prepared using solid-liquid thermally induced phase separation techniques. The polymer in this technique is melt-blended with a compatible liquid such as mineral oil or mineral spirits, is shaped and cooled under conditions to achieve thermally induced phase separation, followed by orienting, i.e., stretching, the article and, optionally, removing the compatible liquid.

Ethylene-vinyl alcohol copolymer porous membranes have been disclosed. These membranes are produced by dissolving the ethylene-vinyl alcohol copolymer in a solvent such as dimethyl sulfoxide, dimethylacetamide, methylpyrrolidone, pyrrolidone, or a combination of such solvents, and then feeding the polymer solution into a coagulation bath. The membranes and fibers formed by this method are useful for medical purposes such as hemodialysis and for treating blood plasma. Other solvents recognized as being capable of dissolving ethylene-vinyl alcohol copolymers include monohydric alcohols, polyhydric alcohols, phenol, metacresol, formic acid, and mixtures thereof with water, but these are not preferred for the purpose of producing hemodialysis membranes with desirable balanced permeabilities.

Ethylene-vinyl alcohol copolymer microporous powders and membranes have also been described as being prepared by a process utilizing phase separation by means of thermally induced triggering or triggering induced by a non-solvent of a solution of the ethylene-vinyl alcohol copolymer in a mixture containing ω-caprolactam as the essential dissolving constituent.

SUMMARY OF THE INVENTION

The present invention provides, in one aspect, a microporous shaped article comprising ethylene-vinyl alcohol copolymer, said article having an internal structure of a multiplicity of spaced, randomly dispersed, non-uniform shaped particles of ethylene-vinyl alcohol copolymer. Preferably, the particles are joined together by fibrils.

The present invention, in another aspect, provides a process for preparing microporous shaped articles comprising the steps of:

(a) melt blending to form a mixture comprising ethylene-vinyl alcohol copolymer and a compatible polymer or compound in which the copolymer will dissolve to form a solution at the melting temperature of the copolymer, but will phase separate on cooling at or below the crystallization temperature of the ethylene-vinyl alcohol copolymer.

(b) forming a shaped article of the melt blended mixture;

(c) cooling the shaped article to a temperature to cause phase separation to occur between the compatible copolymer or compound and the ethylene-vinyl alcohol copolymer, thereby providing an article comprising an aggregate of a first phase comprising particles of ethylene-vinyl alcohol copolymer in a second phase comprising the compatible polymer or compound with adjacent ethylene-vinyl alcohol copolymer particles being distinct but having a plurality of zones of continuity; and (d) i) collecting said article which has adjacent ethylene-vinyl alcohol copolymer particles which form a network of interconnected micropores therebetween, or ii) extracting the compatible polymer or compound with water and stretching the shaped article in at least one direction while wet to further separate adjacent ethylene-vinyl alcohol copolymer particles from one another and to permanently attenuate the ethylene-vinyl alcohol copolymer in the zones of continuity to form fibrils therebetween and drying, or iii) extracting the compatible polymer or compound with an organic solvent.

When the compatible polymer or compound is removed from the article by extraction with an organic solvent, the article may optionally be stretched in a heated condition before or after removal of the compatible polymer or compound to further separate adjacent ethylene-vinyl alcohol copolymer particles from one another and to permanently attenuate the ethylene-vinyl alcohol copolymer in the zones of continuity to form fibrils therebetween. Preferably, the compatible polymer or compound is a polyhydric alcohol.

The thus-formed microporous material is inherently hydrophilic, can have porosity in the range of about 10 to 75 percent, and possesses good tensile properties.

The formed article, before removal of the compatible polymer or compound and stretching, is generally transparent or translucent, and comprises an aggregate of a first phase of particles of ethylene-vinyl alcohol copolymer in a second phase of the compatible polymer or compound. The particles may be described as spherulites and aggregates of spherulites of the polymer, with the compatible polymer or compound occupying the space between particles. Adjacent particles of copolymer are distinct, but they have a plurality of zones of continuity. That is, the polymer particles are generally surrounded or coated by the compatible polymer or compound, but not completely. There are areas of contact between adjacent copolymer particles where there is a continuum of copolymer from one particle to the next adjacent particle in such zones of continuity.

On stretching, the copolymer particles are pulled apart, permanently attenuating the copolymer in zones of continuity, thereby forming the fibrils and creating a network of interconnected micropores. Such permanent attenuation also renders the article permanently translucent or opaque. Also on stretching, if the compatible polymer or compound is not removed, the compatible polymer or compound remains coated on or surrounds, at least partially, the surfaces of the resultant ethylene-vinyl alcohol copolymer particles. The degree of coating, of course, depends upon the affinity of the compatible polymer or compound for the surface of the copolymer particle, whether the compatible polymer or compound is a liquid or solid, whether stretching dislodges or disrupts the coating, and upon other relevant factors. The particles are usually at least partially coated after stretching. Substantially all of the particles appear to be connected by fibrils.

The size of the micropores is easily controlled by varying the degree of stretching, the amount of compatible polymer or compound employed, melt-quench conditions, compatible polymer or compound removal, and heat stabilization procedures. For the most part, the fibrils do not appear to be broken by stretching, but they are permanently stretched beyond their elastic limit so that they do not elastically recover to their original position when the stretching force is released. As used herein, "stretching" means such stretching beyond the elastic limit so as to introduce permanent set or elongation of the article.

The articles and materials of the present invention, when stretched, have a microporous structure characterized by a multiplicity of spaced, i.e., separated from one another, randomly dispersed, non-uniform shaped, particles of ethylene-vinyl alcohol copolymer connected by fibrils. If the compatible polymer or compound is not removed, the particles of ethylene-vinyl alcohol copolymer are also coated with the compatible polymer or compound.

The preferred article according to the present invention is in the form of a sheet or film, although other article shapes are contemplated and may be formed. For example, the article may be in the form of a tube or filament. Other shapes which can be made according to the disclosed process are also intended to be within the scope of the invention.

Certain terms are used in the specification and claims herein, that are well known for the most part, but may require some explanation.

The term "melting temperature" refers to the temperature at which the ethylene-vinyl alcohol copolymer in a blend of copolymer and compatible polymer or compound will melt. The term "crystallization temperature" refers to the temperature at which the copolymer in the blend will crystallize. The term "equilibrium melting point" refers to the commonly accepted melting temperature of the pure copolymer, as may be available in published references.

The melting and crystallization temperature of ethylene-vinyl alcohol copolymer, in the presence of the compatible polymer or compound, is influenced by both an equilibrium and a dynamic effect. At equilibrium between liquid and crystalline copolymer, thermodynamics require that the chemical potentials of the copolymer repeating unit in the two phases be equal. The temperature at which this condition is satisfied is referred to as the equilibrium melting temperature which will depend upon the composition of the liquid phase. The presence of the compatible polymer or compound in the liquid phase will lower the chemical potential of the copolymer repeating units in that phase. Therefore, a lower melting temperature is required to reestablish the condition of equilibrium, resulting in what is known as a melting temperature depression.

The crystallization temperature and melting temperature are equivalent at equilibrium. However, at non-equilibrium conditions which are normally the case, the crystallization temperature and melting temperature are dependent on the cooling rate and heating rate, respectively. Consequently, the terms "melting temperature" and "crystallization temperature," when used herein, are intended to include the equilibrium effect of the compatible polymer or compound as well as the dynamic effect of the rate of heating or cooling.

DETAILED DESCRIPTION OF THE INVENTION

Figure 1:
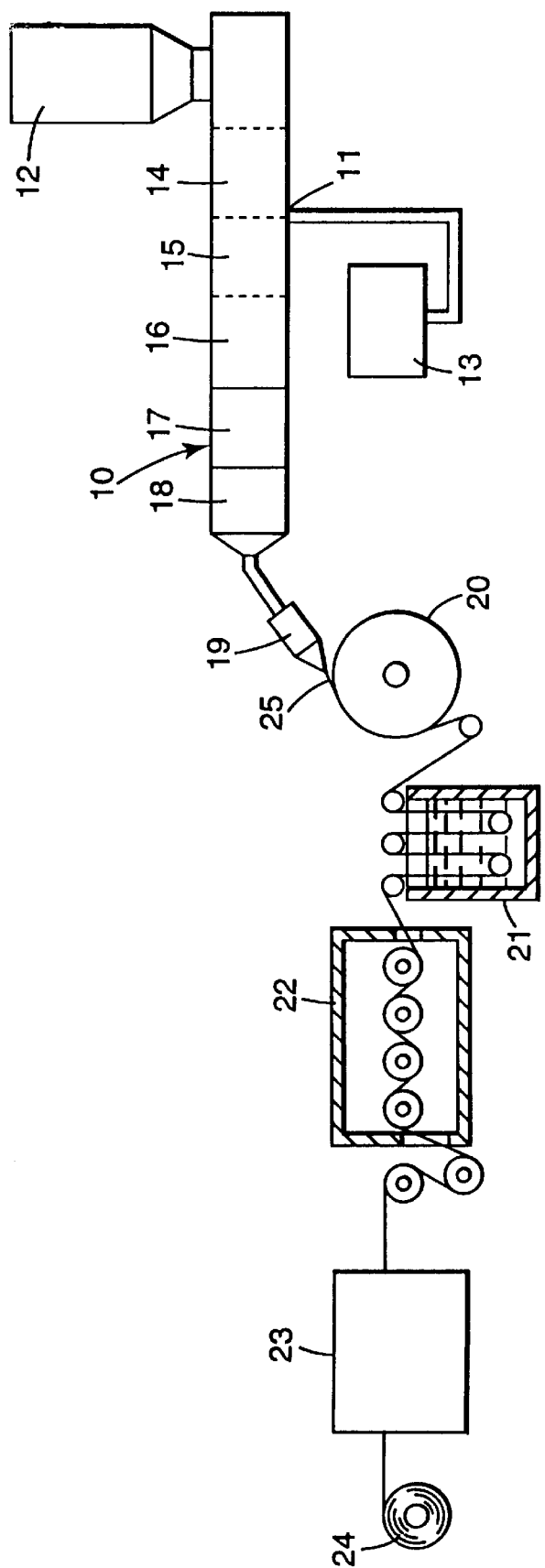
FIG. 1 is a diagrammatical view of an apparatus that may be used in the process of the invention to produce a microporous film according to the invention.

Ethylene-vinyl alcohol copolymers useful in the present invention may be random, block or graft copolymers preferably having an ethylene unit content of about 20 to 90 mol percent, more preferably about 25 to 50 mol percent. The degree of saponification of the copolymer is preferably at least about 80 mol percent, more preferably at least about 95 mol percent, based on the vinyl alcohol units in the copolymer. An insufficient degree of saponification may result in insufficient wet mechanical properties for some purposes. Preferably, the number average molecular weight of the ethylene-vinyl alcohol copolymer is at least about 2000 g/mol, more preferably at least about 20,000 g/mol, most preferably at least about 40,000 g/mol with higher molecular weight copolymers frequently exhibiting better processing and strength characteristics.

The ethylene and vinyl alcohol monomers may be copolymerized with another copolymerizable monomer such as methacrylic acid, vinyl chloride, methyl methacrylate, acrylonitrile and vinyl pyrrolidone to form a terpolymer with the amount of copolymerizable monomer being less than about 15 mol percent. Where a functional group is present as a result of the copolymerizable monomer in the terpolymer, the functional group can serve to provide sites for crosslinking. Crosslinkages may be introduced into the ethylene-vinyl alcohol copolymers or terpolymers by irradiation such as, for example, ultraviolet, electron beam or gamma irradiation. Crosslinkages may also be introduced into the ethylene-vinyl alcohol copolymers before or after membrane formation by treatment with an inorganic crosslinking agent such as a boron compound or an organic crosslinking agent such as a diisocyanate or a dialdehyde. Such crosslinking agents also may be included in the melt blend as long as the phase separation is not adversely affected. Useful ethylene-vinyl alcohol copolymers also include those in which the functional hydroxyl groups of vinyl alcohol units are partially crosslinked with an aldehyde such as formaldehyde, acetaldehyde, butyraldehyde or benzaldehyde but preferably to an extent of not more than about 30 mol percent.

Compounds suitable for blending with the ethylene-vinyl alcohol copolymer to make the microporous materials of the present invention are liquids or solids at room temperature, in which the copolymer will dissolve to form a solution at the melting temperature of the copolymer, but will phase separate on cooling at or below the crystallization temperature of the copolymer. Preferably, these compounds have a boiling point at atmospheric pressure at least as high as the melting temperature of the ethylene-vinyl alcohol copolymer. However, compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these same parameters for the crystallizable polymer.

In the present invention, suitable compounds for blending with the ethylene-vinyl alcohol copolymers include, for example, polyhydric alcohols such as polyethylene glycol, polypropylene glycol, ethylene glycol, triethylene glycol, and glycerin. Preferably, the polyhydric alcohol has a number average molecular weight below about 600 g/mol to provide sufficient compatibility with the ethylene-vinyl alcohol copolymer.

A particular combination of copolymer and compatible polymer or compound may include more than one copolymer, i.e., a blend of two or more copolymers and/or more than one compatible polymer or compound. Optionally, if desired, the copolymer may include blended therein certain conventional additive materials, which materials should be limited in quantity so as not to interfere with the formation of the microporous material and so as not to result in unwanted exuding of the additive. Such additives may include, for example, antistatic materials, antioxidants, dyes, pigments, sorbent materials, molecular sieves, activated carbon, graphite, plasticizers, elastomers, ultraviolet light absorbers, and the like. When used, the amount of such conventional additive is typically less than about 10% of the weight of the copolymer component, and preferably less than about 2% by weight.

The melt blend preferably comprises from about 30 to about 80 parts by weight of the ethylene-vinyl alcohol copolymer and about 20 to about 70 parts by weight of the compatible polymer or compound, more preferably from about 40 to about 70 parts by weight of the ethylene-vinyl alcohol copolymer and about 30 to about 60 parts by weight of the compatible polymer or compound. The ethylene-vinyl alcohol copolymer and the compatible polymer or compound are preferably heated to at least the melting temperature of the melt blend and preferably to a temperature in the range of about 10 to 100° C. above the melt temperature of the melt blend for ease of handling of the melt.

Microporous materials of the present invention may be prepared by casting a shaped article such as a sheet or layer from the melt blend comprising the ethylene-vinyl alcohol copolymer and the compatible polymer or compound. Depending upon the particular copolymer employed, the shaped article is cooled in a quench bath at an appropriate temperature, preferably at least about 60° C. below the equilibrium melting point of the pure copolymer, to provide a proper cooling rate. For example, for ethylene-vinyl alcohol copolymer melt blend having an equilibrium melting point of 175° C., a cooling temperature between about 40° C. and about 120° C. or more is employed. Some minor degree of experimentation may be required to identify the appropriate temperature range which produces optimum phase separation for a particular copolymer/compatible polymer or compound system, this being well within the capability of those skilled in the art once apprised of the present disclosure.

The attainment of the microporous materials of the present invention is dependent upon the rate of cooling. During cooling, heat is removed from the melt blend until the crystallization temperature of the ethylene-vinyl alcohol copolymer in the melt blended mixture is reached, and solidification and phase separation of the copolymer can begin. Cooling temperatures greater than about 160° C. below the equilibrium melting point of the pure copolymer may cause too rapid quenching of the melt blend and can result in single phase form, which, although strong and transparent, are substantially incapable of being rendered uniformly microporous by stretching.

Reference will now be made to the apparatus of FIG. 1 in order to illustrate one preferred method for practicing the present invention. The ethylene-vinyl alcohol copolymer is introduced into the hopper 12 of an extruder apparatus 10. The compatible polymer or compound is fed by a suitable feeding device 13 into the extruder 10 via a port 11 in the extruder wall intermediate the hopper 12 and an extruder exit 17. The extruder preferably has at least three zones, 14, 15, and 16 which are respectively heated at decreasing temperatures towards the extruder exit 17. A slot die 19, having a slit gap of about 25 to about 1000 micrometers, is positioned after the extruder. It is also preferable to utilize a suitable mixing device such as a static mixer 18 between the extruder exit 17 and the slot die 19. In passing through the extruder and, where used, the static mixer, the mixture of copolymer and compatible polymer or compound is heated to a temperature at or at least about 10° C. above the melting temperature of the melt blend, but below the thermal degradation temperature of the copolymer, and is mixed to form a melt blend that is extruded through the slot die 19 as a layer 25 onto a quench wheel 20 maintained at a suitable temperature below the crystallization temperature of the ethylene-vinyl alcohol copolymer.

The cooled film may then be led from the quench wheel 20 to a compatible polymer or compound removal bath 21 containing water or another solvent capable of dissolving the compatible polymer or compound but not the ethylene-vinyl alcohol copolymer, if removal of the compatible polymer or compound is desired. The film, when water is used as the extraction bath, preferably is then directed to a machine-direction stretching device 22 and a transverse direction stretching device 23, and then to a take-up roller 24 for winding into a roll. Where a solvent other than water is used to remove the compatible polymer or compound, the film may be dried prior to stretching and then stretched in a heated condition, e.g., from about 70° C. to 140° C. Stretching in two directions as done by the apparatus of FIG. 1 is, of course, optional.

A further method of forming a membrane material from the blended melt includes casting the extruded melt onto a patterned chill roll to provide areas where the blend does not contact the chill roll to provide a membrane of substantially uniform thickness having a patterned surface, the patterned surface providing substantially skinless areas having high microporosity and skinned areas of reduced mnicroporosity. Such a method is described in U.S. Pat. No. 5,120,594 (Mrozinski) which is incorporated by reference herein. Alternatively, the membrane material may be cast onto a wheel coated with the compatible polymer or compound used to form the melt blend. The membrane material can then be extracted and oriented, i.e., stretched, as described above.

The porosity of the microporous articles can be increased by stretching, typically with an increase in length (elongation) of about 10%. Stretching to provide a total area increase of about 10% to about 1200% is generally useful. The actual amount of stretching required will depend upon the particular composition of the article and the degree of porosity desired. Stretching may be provided by any suitable device which can provide stretching in at least one direction, and may provide stretching both in that direction and in the transverse direction. Stretching should be uniform to obtain uniform and controlled porosity.

The microporous sheet materials of the present invention are preferably dimensionally stabilized according to conventional, well known techniques, such as by heating the stretched sheet, while it is restrained, at a heat stabilizing temperature.

If the microporous article of the invention is dried but not annealed, i.e., subjected to a heat treatment, it is dimensionally stable as long as the film is kept in equilibrium by constant temperature and humidity. Dimensional stability under conditions of changing temperature and humidity can be improved with higher annealing temperatures. Shrinkage or expansion when exposed to heat or water is a feature which can make the microporous article useful for moisture indicating or for forcing another compound from the pores of the film after exposure. For printing applications, it is preferable to avoid curling caused by mismatched dimensional changes of the microporous film and optional release liner under heat and humidity. This can be accomplished by selecting the release liner and microporous film to have substantially equal expansivity properties.

The films of the present invention generally possess sufficient tensile strength for subsequent handling, depending upon the tensile strength of the ethylene-vinyl alcohol copolymer employed, the zones of continuity, the extent of stretching, and the various process conditions.

The compatible polymer or compound may be removed from the microporous sheet to provide a unique microporous sheet material formed only of the ethylene-vinyl alcohol copolymeric material. Removal of the polyhydric alcohol may be accomplished by extraction, volatilization, or any other convenient method. The preferred extraction solvents include water and organic solvents such as, for example, isopropyl alcohol, ethanol, methanol, n-butanol, hydrochlorofluorocarbons, acetone, methyl ethyl ketone and 1,1,1-trichloroethane. Once the compatible polymer or compound has been removed, the resultant microporous sheet may be imbibed, if desired, with various materials to provide any one of a variety of specific functions, thereby providing unique articles. For example, the imbibing material may be a liquid, solvent solution, solvent dispersion, or solid. Such materials may be imbibed by any one of a number of known methods which result in the deposition of such materials within the porous structure of the microporous sheet. Some imbibing materials are merely physically placed within the microporous sheet. In some instances, the use of two or more reactive components as the imbibing materials permits their reaction within the microporous sheet structure. Examples of imbibing materials which might be employed in the present invention include isorefractive liquids, medicaments, fragrances, antistatic agents, surfactants, UV stabilizers, dyes, inks, pesticides, polymers, and solid particulate materials such as activated carbon and pigments. Certain materials, such as antistatic agents, antioxidants or surfactants, may be imbibed without first effecting removal of the compound.

The microporous sheet material, either before or after removal of the additive compound, may be further modified by the deposition thereon of any one of a variety of compositions, by any one of a variety of known coating or deposition techniques. For example, the microporous sheet material may be coated with metal by vapor deposition or sputtering techniques, or it may be coated with adhesives, aqueous or solvent-based coating compositions, or dye solutions. Coating may be accomplished by such other conventional techniques such as roll coating, spray coating, dip coating, or any other known coating techniques. Sheets of the microporous material may be coated, for example, with an antistatic material by conventional wet coating or vapor coating techniques.

The microporous sheet materials of the present invention may be laminated to any one of a variety of other structures, such as other sheet materials, to provide composite structures which include the microporous sheet materials of the present invention. The other structures may include, for example, polymeric or metallic film, a woven or knit fabric, a nonwoven web, paper, or synthetic paper. Lamination can be accomplished by conventional techniques such as adhesive bonding, heat or ultrasonic welding, or by other techniques which do not destroy or otherwise interfere with the porosity or create undesirable porosity or perforations.

Microporous materials of the present invention may be employed in a wide variety of situations where their microporous structures are useful. For example, they may be used in the ultrafiltration of colloidal matter, as diffusion barriers, or as separators in electrochemical cells. Further, they may be laminated to other materials such as polymeric or metallic films and the laminate may be utilized to form such articles as image receptive substrates, although the microporous structures are themselves useful as image receptive substrates. The microporous sheets of the present invention may also be laminated to a woven or knit fabric or a nonwoven web such as a nonwoven scrim, which may be used to produced a disposable protective garment for use, for example, in a hospital or in an electronic clean room or in other areas such as where caustic chemical spills may be a problem.

The microporous sheet materials of the present invention are also particularly useful as receptive media for use with aqueous image-forming substances. Such receptive means are described in U.S. Pat. No. 5,443,727 (Gagnon et al.) which is incorporated by reference herein. As an image receptive media the microporous sheet materials of the present invention are useful with all presently known printing technologies, regardless of the chosen format such as, for example, posters, transparencies, documents, signs, labels and color proofs. As an image receptive media the microporous sheet materials are also useful for drawings by hand such as with, for example, felt-tip, ball point or fountain pen or with printing devices such as, for example, pen plotters, ink-jet printers and mass transfer printers. Furthermore, the image receptive media is also useful in copying processes, i.e., xerography, in black and white copiers and color copiers, as well as with various printing techniques such as, for example, thermal mass transfer, thermal dye transfer, ink-jet printing, impact-printing, electrophotography, offset printing, and flexographic printing processes.

The microporous sheet materials may be further utilized as filtering materials for cleaning antibiotics, beer, oils, bacteriological broths, for sample collection in air analysis, and for collecting microbiological specimens. They may also be utilized to make surgical dressings, bandages, and in other medical applications. Those of ordinary skill in the art will recognize that there are many other uses for microporous materials made in accordance with the present invention.

The following examples are given to show microporous materials which have been made in accordance with the present invention. However, it will be understood that the following examples are exemplary only, and are in nowise comprehensive of the many different types of microporous materials which may be made in accordance with the present invention. Unless otherwise specified, all parts and percentages set forth in the following examples are by weight.

In the examples the following test methods were used to evaluate the membrane materials produced.

Gurley Value: This value is a measurement of time in seconds to pass 50 cc of air through a sheet material according to ASTM Test D-726 Method A.

Porosity: A calculated value based on the measured bulk density and polymer density using the following equation:

$$\text{Porosity} = 1 - \left(\frac{\text{bulk density}}{\text{polymer density}}\right) \times 100$$

Thickness: Measured using a TMI™ caliper gauge, available from Testing Machine, Inc., Amityville, N.Y.

Surface Energy: Test solutions were prepared using water (surface energy=72 dynes/cm), water/methanol solutions (surface energy<72 dynes/cm) and water/sodium chloride solutions (surface energy>72 dynes/cm) to provide solutions having surface energies of 30 to 55 dynes/cm in 5 dynes/cm increments, 55 to 72 dynes/cm in 1 dyne/cm increments and 72 to 82 in 0.5 dyne/cm increments, using reagent grade materials and surface energies interpolated from tables in the Handbook of Chemistry and Physics, 71st edition, CRC Press, p 6–102 & 103.

Microporous sheet materials were placed on a light box under conditions maintained at about 22° C. and 33% relative humidity. A drop of each of the test solutions was placed on the sheet material and observed for 30 seconds. The surface energy is equivalent to the solution with the highest surface energy that penetrated the sheet material, i.e., changed the sheet material from opaque to transparent, next to the drop that did not penetrate the sheet material, i.e., the sheet material remained opaque, or only partially penetrated the sheet material.

Bubble Point: This value represents the largest effective pore size measured in microns according to ASTM Test F-316-80.

Tensile and Elongation: Measured values according to ASTM Test D-882 using an INSTRON™ Model 1122 under the following conditions:

Jaw gap: 2.5 cm
Jaw speed: 12.5 cm/min
Sample size 2.5 cm wide

Both the tensile and the elongation are measured at break, MD indicating extrusion direction and TD indicating transverse the extrusion direction.

Hygroexpansivity: was measured using TAPPI Useful Method 549 except changes in length were measured at about equilibrium at 95% relative humidity.

EXAMPLE 1

Melt blended in a twin screw extruder operated at a decreasing temperature profile of 250° C. to 193° C. were 66 weight percent ethylene-vinyl alcohol copolymer (melt flow index 0.8 g/10 min @ 190° C. (ASTM D1238); ethylene/vinyl alcohol mol ratio of 32:68, available as EVAL F-100B™ from Eval Corp. of America) and 34 weight percent polyethylene glycol (available as PEG 200 from Dow Chemical Co.). The melt blend was extruded through a slip gap sheeting die having an orifice of 35.6 cm×0.05 cm and quenched on a patterned casting wheel having pyramidal-like projections having diamond-shaped peaks 0.02 $mm^2$, to provide about 10% contact area maintained at 71° C. The resulting 0.2 mm cast sheet material was washed in a water bath at ambient conditions to remove the polyethylene glycol. Excess water was removed from the surface of the sheet material by squeezing, then the sheet material was immediately stretched in the machine direction 1.75:1 on a roll type length orienting machine, and in the transverse direction 1.75:1 at ambient conditions in a conventional film tenter. In a separate step, the sheet material was gradually heated under tension to remove the remaining water at an increasing temperature profile of 35° C. to 110° C. over five heated rolls. The physical properties are set forth in Table 1.

Figure 2:
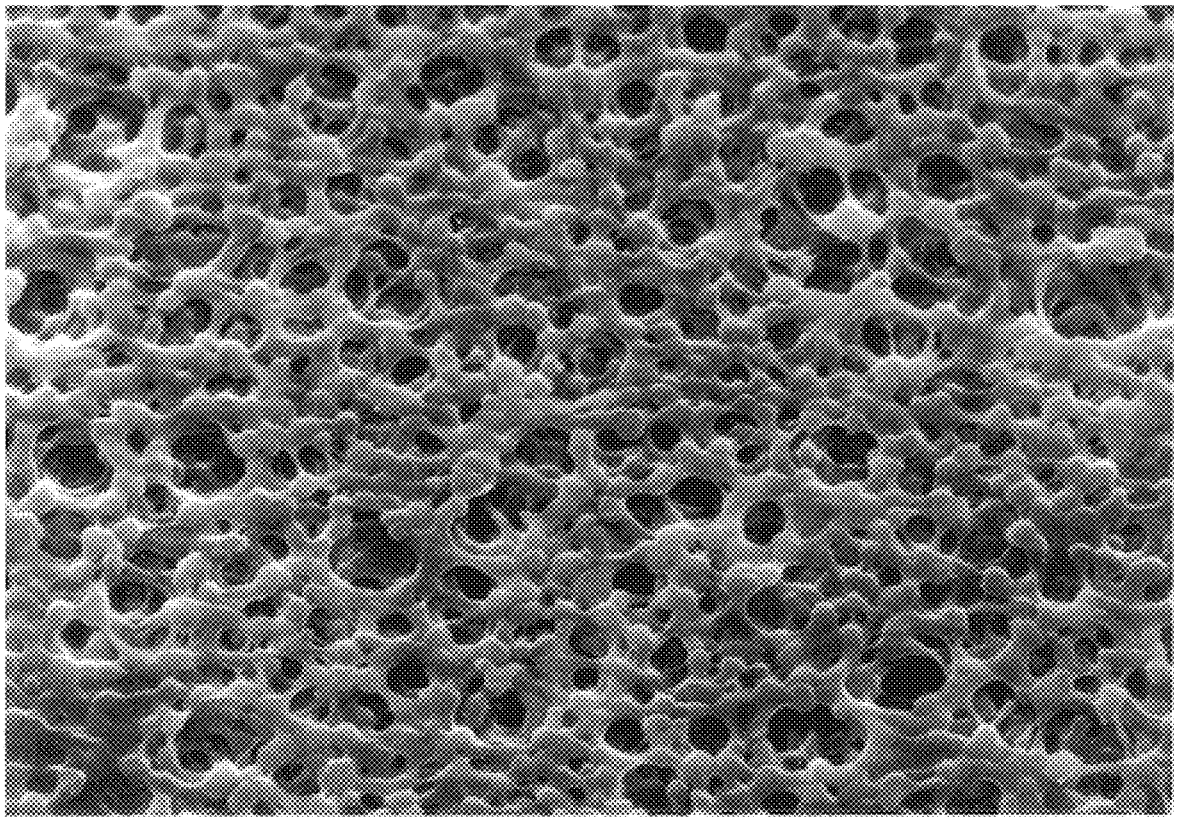
FIG. 2 is a photomicrograph of the surface of side A of the membrane material of Example 1 at 2000×.
Figure 3:
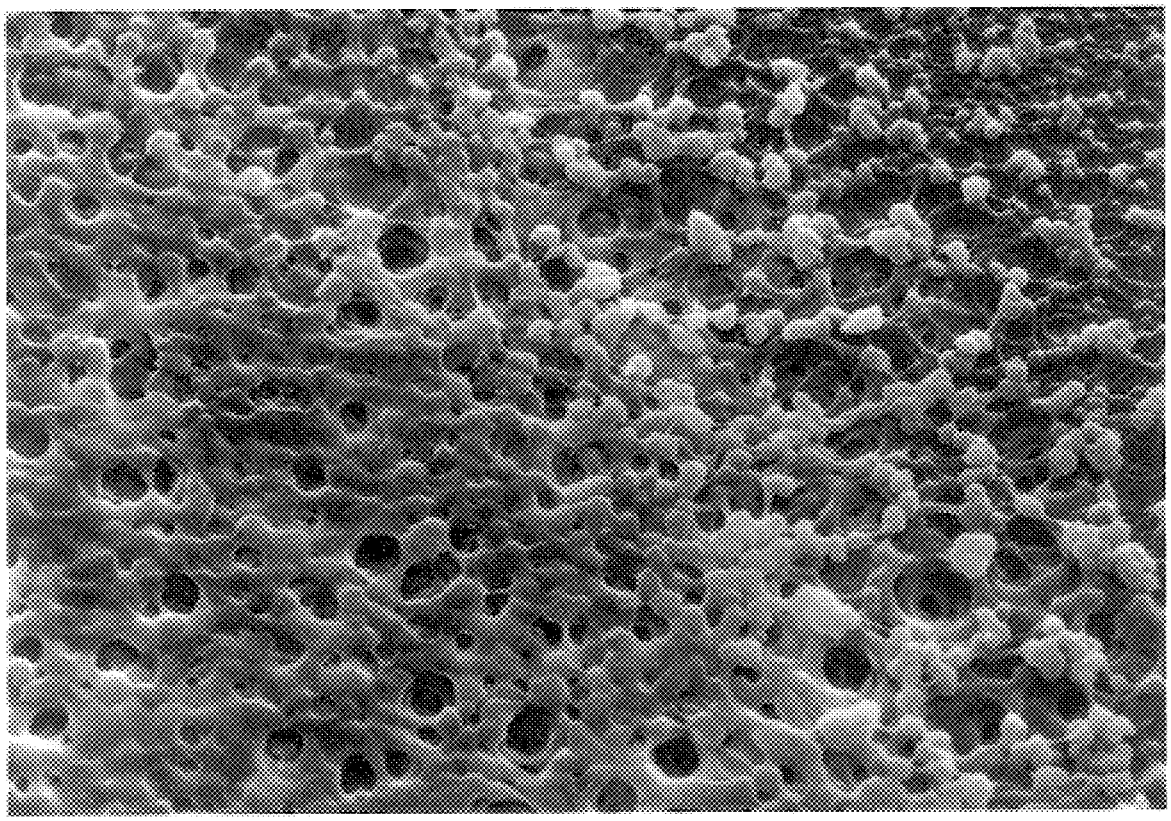
FIG. 3 is a photomicrograph of the surface of side B of the membrane material of Example 1 at 2000×.

Photomicrographs of each surface are shown in FIG. 2, the side not contacting the casting wheel and FIG. 3, the side contacting the casting wheel. Skin formation is seen in FIG. 3 where the sheet material contacted the casting wheel.

TABLE 1

| Gurley Value (sec/50 cc) | 14 | Porosity (%) | 58.5 |
|---|---|---|---|
| Thickness (μm) | 102 | Surface Energy (dynes/cm) | 66 |
| Bubble Point (μm) | 0.84 | | |
| Tensile MD (MPa) | 16.6 | Elongation MD (%) | 10 |
| Tensile TD (MPa) | 12.3 | Elongation TD (%) | 10 |

EXAMPLE 2

Microporous membrane sheet material was prepared as in Example 1, except 67.5 weight percent ethylene-vinyl alcohol copolymer and 32.5 weight percent polyethylene glycol were used, the casting wheel had a diamond cross hatch pattern with the surface width of each land area about 0.12 mm which provided about 40% land area and was maintained at 49° C., and 1,1-dicholoro-2,2,2-trifluoroethane was used to extract the polyethylene glycol. The 1,1-dicholoro-2,2,2-trifluoroethane was allowed to evaporate from the sheet material before the stretching process. The sheet material was length oriented 2:1 at 88° C., and transverse oriented 2:1 at 88° C. The properties of the sheet material are set forth in Table 2.

TABLE 2

| | | | |
|---|---|---|---|
| Gurley Value (sec/50 cc) | 13 | Porosity (%) | 60.0 |
| Thickness (μm) | 140 | Surface Energy (dynes/cm) | 77 |
| Bubble Point (μm) | 1.30 | | |
| Tensile MD (MPa) | 16.1 | Elongation MD (%) | 14 |
| Tensile MD (MPa) | 16.6 | Elongation TD (%) | 16 |

EXAMPLE 3

Microporous membrane sheet material was prepared as in Example 2, except 63 weight percent ethylene-vinyl alcohol copolymer, 34 weight percent polyethylene glycol and 3 weight percent elastomer (PELLETHANE™ 2355, available from Dow Chemical Co.) were melt blended and extruded. The extruder temperature profile was 199° C. to 188° C., the casting wheel temperature was maintained at 63° C., and the stretch ratio was 1.75:1×1.75:1 at 88° C. The properties of the sheet material are set forth in Table 3.

TABLE 3

| | | | |
|---|---|---|---|
| Gurley (sec/50 cc) | 51 | Porosity (%) | 44.0 |
| Thickness (μm) | 137 | Surface Energy (dynes/cm) | 74 |
| Bubble Point (μm) | 0.51 | | |
| Tensile MD (MPa) | 27.0 | Elongation MD (%) | 39 |
| Tensile TD (MPa) | 27.6 | Elongation TD (%) | 38 |

As can be seen from the data in Tables 2 and 3, addition of the elastomer increased the tensile and elongation of the sheet material significantly although the Gurley value increased and the bubble point decreased indicating a decrease in average pore diameter.

EXAMPLE 4

Microporous membrane sheet material was prepared as in Example 1, except 63 weight percent ethylene-vinyl alcohol copolymer, 28 weight percent polyethylene glycol and 9 weight percent glycerin (USP 99.7% natural, available from Proctor and Gamble Co.) were melt blended and extruded. The casting wheel was maintained at 82° C. The properties of the sheet material are set forth in Table 4.

TABLE 4

| | | | |
|---|---|---|---|
| Gurley Value (sec/50 cc) | 52 | Porosity (%) | 40.0 |
| Thickness (μm) | 109 | Surface Energy (dynes/cm) | 69 |
| Bubble Point (μm) | 0.76 | | |
| Tensile MD (MPa) | 61.0 | Elongation MD (%) | 7 |

EXAMPLE 5

Microporous membrane sheet material was prepared as in Example 1, except 60 weight percent ethylene-vinyl alcohol copolymer, 20 weight percent polyethylene glycol and 20 weight percent glycerin were melt blended and extruded. The casting wheel was maintained at 88° C., the stretch ratio was 2.5×2.5, and the water was allowed to evaporate from the sheet material at ambient conditions. The properties of the sheet material are set forth in Table 5.

TABLE 5

| | | | |
|---|---|---|---|
| Gurley Value (sec/50 cc) | >10,000 | Porosity (%) | 39.3 |
| Thickness (μm) | 41 | Surface Energy (dynes/cm) | 74 |
| Bubble Point (μm) | 0.01 | | |
| Tensile MD (MPa) | 112.5 | Elongation MD (%) | 30 |

Figure 4:
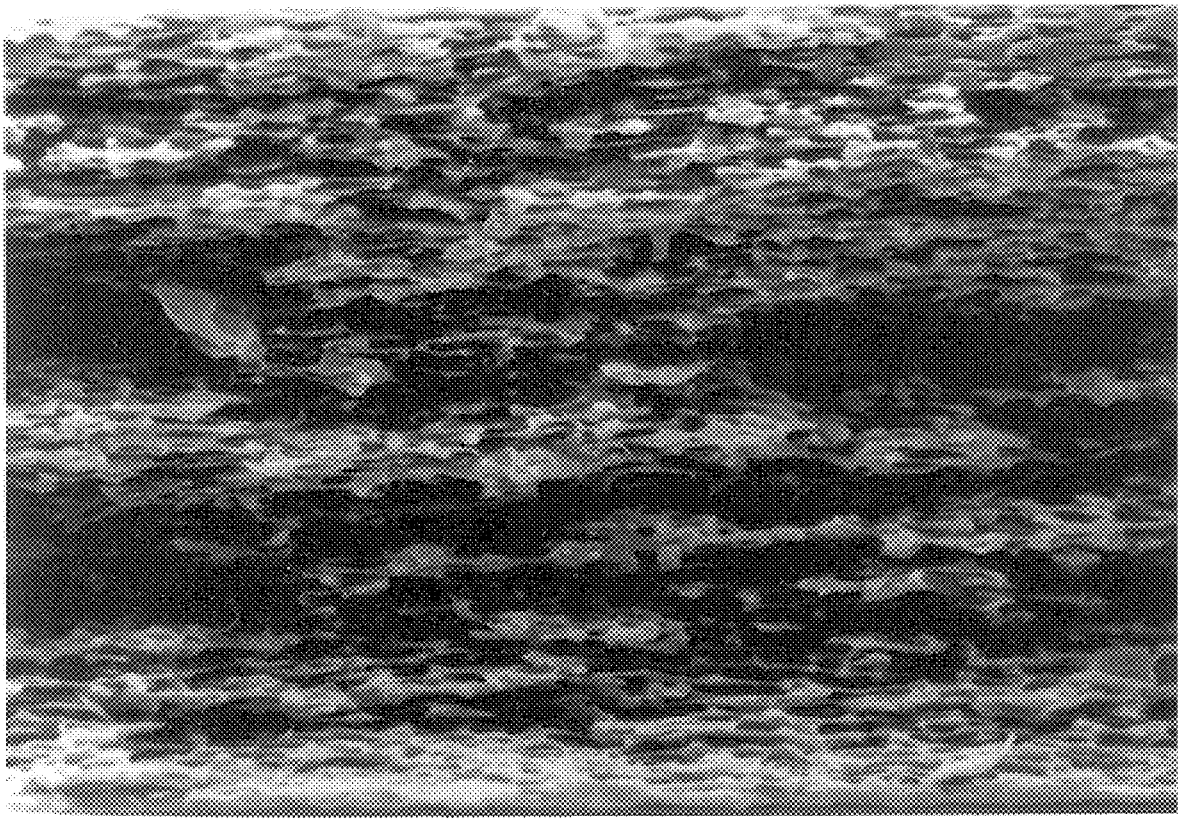
FIG. 4 is a photomicrograph of a cross-sectional view of the membrane material of Example 5 at 2000×.
Figure 5:
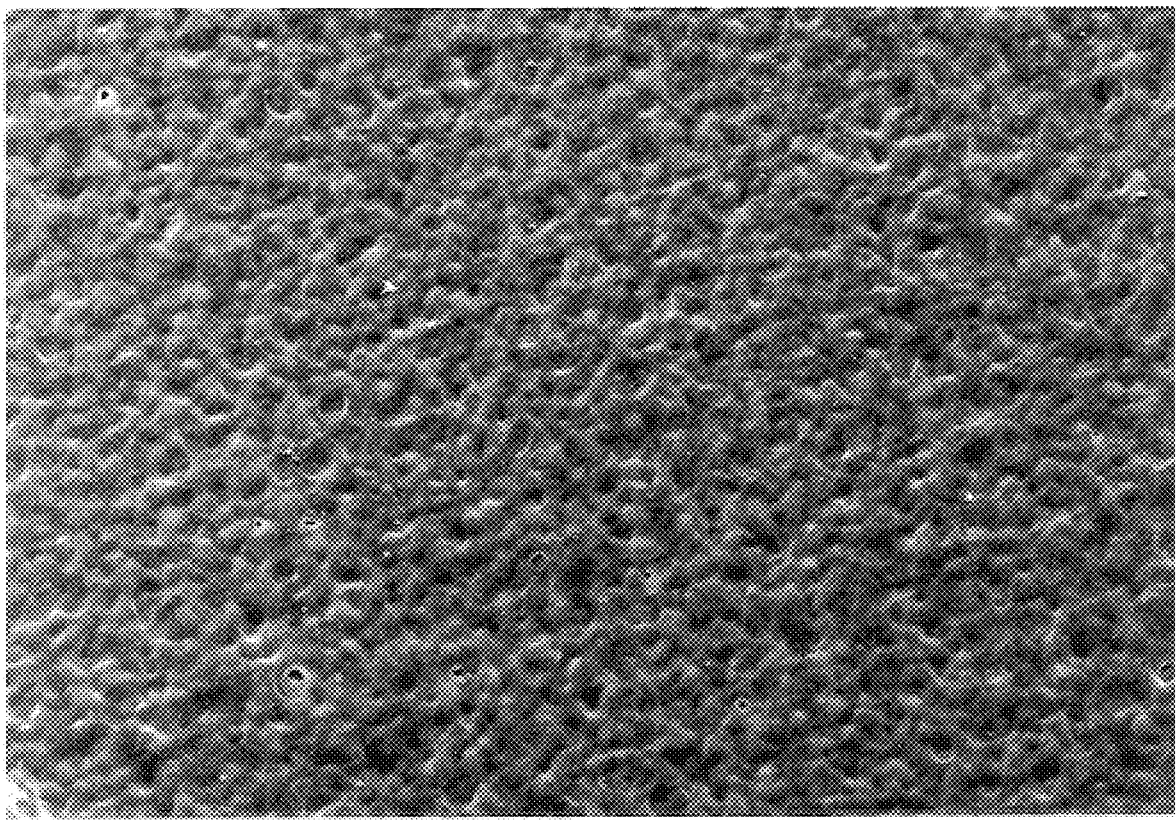
FIG. 5 is a photomicrograph of the surface of the membrane material of Example 5 formed against the casting wheel at 1000×.
Figure 6:
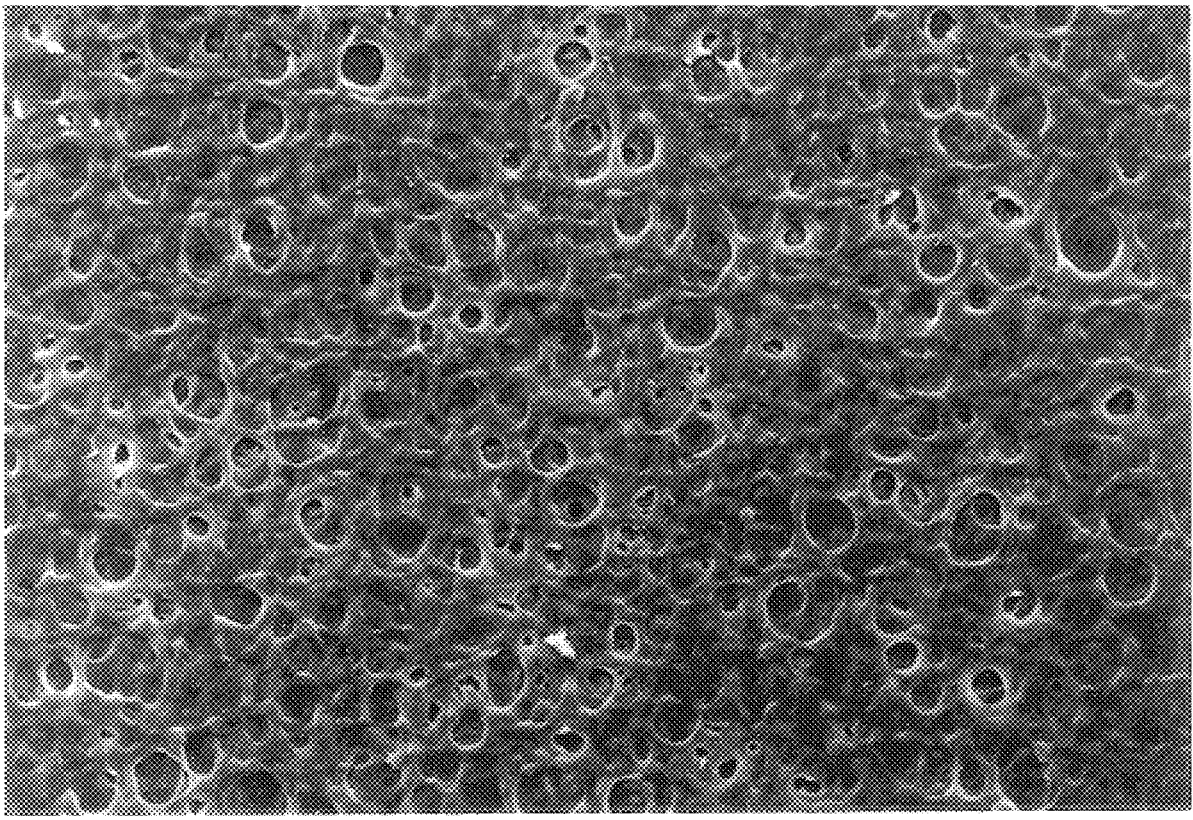
FIG. 6 is a photomicrograph of the surface of the membrane material of Example 5 formed away from the casting wheel in air at 1000×.

As can be seen from the data in Tables 1 and 5, adding glycerin as a diluent to the polyethylene glycol, provides an increase in tensile strength of the sheet material. This microporous sheet material with increased tensile and decreased pore size was obtained by increasing the glycerin concentration and increasing the stretch ratio. The high degree of stretching is believed to have caused pores to collapse. In this Example, no skin was formed on the sheet material where it contacted the casting wheel unlike Example 1 where the contact areas were skin forming. However, a skin did form in the areas not contacting the casting wheel. This can be seen in FIGS. 4 through 6.

EXAMPLE 6

Microporous membrane sheet material was prepared using a composition as in Example 5, except the sheet material was stretched at a ratio of 1.75:1×1.75:1 and the water was heat evaporated as in Example 1. This resulted in a sheet material with a thin skin on the wheel quenched side in the areas not contacting the casting wheel. Sheet material properties are set forth in Table 6.

TABLE 6

| | | | |
|---|---|---|---|
| Gurley Value (sec/50 cc) | 758 | Porosity (%) | 44.3 |
| Thickness (μm) | 81 | Surface Energy (dynes/cm) | 70 |
| Bubble Point (μm) | 0.25 | | |
| Tensile MD (MPa) | 72.2 | Elongation MD (%) | 41 |

The Gurley value decreased and the pore size of the sheet material increased in this Example 6 compared to that of Example 5 due to a lower stretch ratio.

EXAMPLE 7

A microporous sheet material was prepared as in Example 1 except a melt blend of 60 weight percent ethylene-vinyl alcohol copolymer (EVAL F-100B™), 30 weight percent polyethylene glycol (PEG 200), and 10 weight percent glycerin was used, the wheel temperature was maintained at 80° C. and the diluent was not extracted. Sheet material properties are listed in Table 7.

TABLE 7

| | | | |
|---|---|---|---|
| Gurley Value (sec/50 cc) | 95 | Porosity (%) | 20.4 |
| Thickness (μm) | 152 | Surface Energy (dynes/cm) | >82 |

TABLE 7-continued

| Bubble Point (μm) | 0.49 | | |
|---|---|---|---|
| Tensile MD (MPa) | 8.8 | Elongation MD (%) | 111 |
| Tensile TD (MPa) | 8.3 | Elongation TD (%) | 97 |

As can be seen in Table 7, porosity of the sheet material is achieved even with the compatible polymer/compound blend retained in the sheet material.

EXAMPLE 8

A 0.27 mm thick sheet of microporous sheet material was prepared as in Example 7, except 40 weight percent ethylene-vinyl alcohol copolymer, 15 weight percent polyethylene glycol and 45 weight percent glycerin were used. The sheet material was cast onto a patterned casting wheel as in Example 1 maintained at 88° C. and washed in a water bath to remove the diluents. The excess surface water was removed and the sheet material was stretched at a ratio of 1.25:1×1.25:1 at ambient conditions. The membrane was heat treated at 110° C. under restraint to remove the residual water. Sheet material properties are listed in Table 8.

| Gurley Value (sec/50 cc) | 8 | Porosity (%) | 57.0 |
|---|---|---|---|
| Thickness (μm) | 267 | Surface Energy (dynes/cm) | 75 |
| Bubble Point (μm) | 1.70 | | |
| Tensile MD (MPa) | 3.4 | Elongation MD (%) | 2 |

This example demonstrates that an ethylene-vinyl alcohol copolymer microporous sheet material having excellent porosity can be produced using a melt blend containing 40 weight percent ethylene-vinyl alcohol copolymer.

EXAMPLE 9

A 0.14 mm thick sheet of microporous sheet material was prepared by extruding a melt blend of 72 weight percent ethylene-vinyl alcohol copolymer and 28 weight percent polyethylene glycol using the procedure of Example 8, except the stretch ratio was 1.5:1×1.5:1. The properties of the sheet material are set forth in Table 9.

TABLE 9

| Gurley Value (sec/50 cc) | 2553 | Porosity (%) | 29.0 |
|---|---|---|---|
| Thickness (μm) | 140 | Surface Energy (dynes/cm) | 66 |
| Bubble Point (μm) | 0.11 | | |
| Tensile MD (MPa) | 43.2 | Elongation MD (%) | 59 |
| Tensile TD (MPa) | 47 | Elongation TD (%) | 29 |

This example demonstrates that a microporous sheet material can be prepared using only 28 weight percent polyethylene glycol as the compatible polymer.

EXAMPLE 10

A sheet of microporous material was prepared by extruding 70 weight percent ethylene-vinyl alcohol copolymer with an ethylene/vinyl alcohol ratio of 27:73 (available as EVAL™ L-101, available from Eval Corp. of America) with 30 weight percent polyethylene glycol (PEG 200). The blend was prepared as in Example 8, except the stretch ratio was 1.75:1×1.75:1. The properties or the sheet material are set forth in Table 10.

TABLE 10

| Gurley Value (sec/50 cc) | 359 | Porosity (%) | 65.0 |
|---|---|---|---|
| Thickness (μm) | 91 | Surface Energy (dynes/cm) | 76 |
| Bubble Point (μm) | 0.22 | | |
| Tensile MD (MPa) | 37.8 | Elongation MD (%) | 6 |
| Tensile TD (MPa) | 38.2 | Elongation TD (%) | 5 |

As can be seen in Table 10, a microporous sheet material having good properties are attainable using an ethylene-vinyl alcohol copolymer having an ethylene/vinyl alcohol ratio of 27:73.

EXAMPLE 11

A sheet of microporous material was prepared by extruding 65 weight percent ethylene-vinyl alcohol copolymer having an ethylene/vinyl alcohol ratio of 48:52 (available as EVAL™ G-156 from Eval Corp. of America) and 35 weight percent polyethylene glycol (PEG 200). This blend was prepared as in Example 8 except the compatible polymer was removed using ethyl alcohol and the sheet material was stretched at a ratio of 1.25:1×1.25:1 at 93° C. Film properties are listed in Table 11.

TABLE 11

| Gurley Value (sec/50 cc) | >10,000 | Porosity (%) | 18.4 |
|---|---|---|---|
| Thickness (μm) | 262 | Surface Energy (dynes/cm) | 65 |
| Bubble Point (μm) | 0.08 | | |
| Tensile MD (MPa) | 15.6 | Elongation MD (%) | <1 |
| Tensile TD (MPa) | 9.7 | Elongation TD (%) | <1 |

This example demonstrates that a microporous sheet material can be prepared using a ethylene-vinyl alcohol copolymer having a lower vinyl alcohol content.

EXAMPLE 12

A sheet of microporous membrane was made as in Example 1, except 67 weight percent ethylene-vinyl alcohol copolymer with an ethylene/vinyl alcohol ratio of 44:56 (available as EVAL™ E151A from Eval Corp. of America) and 33 weight percent polyethylene glycol (PEG-200) were used, the melt profile of the twin screw extruder was decreased from 210° C. to 187° C., and the sheet material was quenched in a bath containing the polyethylene glycol maintained at 54° C. The sheet material was biaxially oriented at a ratio of 1.75:1×1.75:1 using length orienting machine rolls maintained at 95° C. in a tenter oven maintained at 93° C. during orientation. The sheet material was not washed. Properties are set forth in Table 12.

TABLE 12

| | | | |
|---|---|---|---|
| Gurley Value (sec/50 cc) | 24 | Porosity (%) | 41.9 |
| Thickness (μm) | 104 | Surface Energy (dynes/cm) | >82 |
| Bubble Point (μm) | 0.77 | | |
| Tensile MD (MPa) | 9.2 | Elongation MD (%) | 26 |
| Tensile TD (MPa) | 5.5 | Elongation TD (%) | 51 |

EXAMPLE 13

A microporous sheet of ethylene-vinyl alcohol copolymer was prepared using a blend of 60 weight percent ethylene-vinyl alcohol copolymer (EVAL™ F100B) and 40 weight percent triethylene glycol as in Example 8, except the sheet material was quenched on a smooth casting wheel maintained at 88° C. and was oriented at a ratio of 1.75:1×1.75:1. The properties are set forth in Table 13.

TABLE 13

| | | | |
|---|---|---|---|
| Gurley Value (sec/50 cc) | 540 | Porosity (%) | 52.2 |
| Thickness (μm) | 66 | Surface Energy (dynes/cm) | 72 |
| Bubble Point (μm) | 0.56 | | |
| Tensile MD (MPa) | 50.8 | Elongation MD (%) | 63 |
| Tensile TD (MPa) | 61.6 | Elongation TD (%) | 63 |

EXAMPLE 14

A sheet of microporous film was made by extruding a melt blend of 44 weight percent EVAL™ L101 and 11 weight percent EVAL™ G156 polyethylene-vinyl alcohol copolymers and 45 weight percent polyethylene glycol (PEG-200) as in Example 8, except the wheel was maintained at 79° C. and the stretch ratio was 1.75:1×1.75:1. Properties are set forth in Table 14.

TABLE 14

| | | | |
|---|---|---|---|
| Gurley Value (sec/50 cc) | 1110 | Porosity (%) | 57.8 |
| Thickness (μm) | 147 | Surface Energy (dynes/cm) | 55 |
| Bubble Point (μm) | 0.50 | | |
| Tensile MD (MPa) | 5.9 | Elongation MD (%) | 3 |
| Tensile TD (MPa) | 17.0 | Elongation TD (%) | 5 |

This Example 14 demonstrates the use of a blend of two polyethylene-vinyl alcohol copolymers in producing microporous sheet material.

EXAMPLES 15A 15B and 15C

In Examples 15A, 15B and 15C, microporous sheet materials were prepared as in Example 13, except polyethylene glycol (PEG 200) was substituted for the triethylene glycol and the sheet material was oriented at a stretch ratio of 2:1×2:1. The casting wheel temperature in Example 15A was maintained at 88° C., in Example 15B at 71° C., and in Example 15C at 54° C., respectively. The properties are listed in Table 15.

TABLE 15

| | Example 15A | Example 15B | Example 15C |
|---|---|---|---|
| Gurley Value (sec/50 cc) | 22 | >10,000 | >10,000 |
| Thickness (μm) | 86 | 84 | 85 |
| Bubble Point (μm) | 0.60 | 0.38 | 0.49 |
| Porosity (%) | 66.9 | 57.0 | 62.0 |
| Surface Energy (dynes/cm) | 69 | 69 | 68 |
| Tensile Strength MD (MPa) | 13.5 | 24.9 | 19.2 |
| Elongation MD (%) | 9 | 12 | 10 |
| Tensile Strength TD (MPa) | 8.8 | 22.0 | 15.4 |
| Elongation TD (%) | 4 | 8 | 6 |

Due to the temperature of the casting wheel in Examples 15B and 15C, 71° C. and 54° C., respectively, a skin formed on the side of the sheet materials contacting the wheel. However, in Example 15A in which the casting wheel was at 88° C., no skin formed indicating the effect of the crystallization rate of the polymer on the porous properties of the microporous sheet materials.

EXAMPLES 16A, 16B. 16C and 16D

Microporous sheet material was prepared by extruding a melt blend of 55 weight percent ethylene-vinyl alcohol copolymer (EVAL F100B) and 45 weight percent of a mixture of glycerin and polyethylene glycol (PEG-200) as the phase separating diluent. The sheet materials were made as in Example 8, except the sheet materials were oriented to their maximum before breaking, and the casting wheel was maintained at 79° C. The ratio of glycerin and polyethylene glycol for Examples 16A, 16B, 16C and 16D were 100:0, 75:25, 50:50 and 25:75, respectively, while the stretch ratios were 1.5:1×1.5:1, 2.5:1×2.5:1, 1.4:1×1.4:1 and 1.2:1×1.2:1, respectively. Properties are as set forth in Table 16.

TABLE 16

| | Example 16A | Example 16B | Example 16C | Example 16D |
|---|---|---|---|---|
| Gurley Value (sec/50 cc) | 39 | 116 | 48 | >10,000 |
| Thickness (μm) | 142 | 48 | 140 | 165 |
| Bubble Point (μm) | 0.16 | 0.71 | 0.25 | 0.14 |
| Porosity (%) | 23.0 | 62.8 | 25.0 | 12.0 |
| Tensile Strength MD (MPa) | 7.7 | 34.3 | 6.0 | 5.6 |
| Elongation MD (%) | 126 | 18 | 88 | 115 |

These examples demonstrate that the maximum tensile strength of sheet material with these blends occurred at a ratio of glycerin:polyethylene glycol of about 75:25 which permitted the microporous sheet material to be stretched at a ratio of 2.5:1×2.5:1.

EXAMPLE 17A, 17B and 17C

Ethylene-vinyl alcohol copolymer microporous sheet materials were prepared as in Example 4, except the casting wheel was maintained at 88° C. and the sheet materials of Examples 17A, 17B and 17C were dried at temperatures of 116° C., 135° C. and 149° C., respectively. The properties are set forth in Table 17.

TABLE 17

|  | Example 17A | Example 17B | Example 17C |
|---|---|---|---|
| Gurley Value (sec/50 cc) | 285 | 249 | 191 |
| Thickness (μm) | 71 | 76 | 74 |
| Bubble Point (μm) | 0.45 | 0.39 | 0.30 |
| Porosity (%) | 43.3 | 41.3 | 40.6 |
| Surface Energy (dynes/cm) | 74 | 73 | 70 |
| Tensile Strength MD (MPa) | 40.5 | 44.1 | 41.8 |
| Elongation MD (%) | 114 | 111 | 113 |
| Tensile Strength TD (MPa) | 42.6 | 42.5 | 40.4 |
| Elongation TD (%) | 106 | 112 | 115 |

These examples particularly demonstrate the effect of drying temperature on the Gurley value and bubble point at the mixing ratios used. The hygroexpansivity for each film was measured at the equilibrium length reached at 95% relative humidity. The hygroexpansivities were—3.6%, 0.1% and 1.1%, respectively, for Examples 17A, 17B and 17C.

EXAMPLE 18

This example was prepared as in Example 17C except that an atomized mist of water was applied to the sheet material after stretching in the length direction and prior to stretching in the width direction to maintain the plasticizing effects of water during stretching in the tenter. Properties are listed in Table 18.

TABLE 18

| Gurley Value (sec/50 cc) | 154 | Porosity (%) | 41.8 |
|---|---|---|---|
| Thickness (μm) | 74 | Surface Energy (dynes/cm) | 72 |
| Bubble Point (μm) | 0.36 | | |
| Tensile MD (MPa) | 40.6 | Elongation MD (%) | 94 |
| Tensile TD (MPa) | 39.1 | Elongation TD (%) | 101 |

As can be seen from the data in Tables 17 and 18, the addition of the water spray significantly reduced the Gurley value in Example 18 when compared to Example 17C.

EXAMPLE 19

A 250 μm sheet material was prepared as in Example 15, except the sheet material was quenched in a water bath maintained at 47° C., and was not stretched. The sheet material was not porous because of skin on both surfaces of the sheet material. Unlike other skinned sheet materials, the skin could easily be peeled off, exposing the porous membrane. The peeled sheet material had a Gurley value of 180 seconds/50 cc after 1.75:1 length stretching by hand.

EXAMPLE 20

A microporous sheet material was prepared as in Example 8 except the blend ratio of polyethylene-vinyl alcohol copolymer/polyethylene glycol/glycerin was 50/12.5/37.5 and the stretch ratio was 1.75:1×1.75:1. A sample of the sheet material was tested for filtration properties and passed 100 mL distilled water at 400 mm Hg vacuum in 8 seconds the 9.6 cm² membrane area. Properties are set forth in Table 20.

TABLE 20

| Gurley Value (sec/50 cc) | 3 | Porosity (%) | 71.2 |
|---|---|---|---|
| Thickness (μm) | 89 | Surface Energy (dynes/cm) | 73 |
| Bubble Point (μm) | 1.40 | | |
| Tensile MD (MPa) | 7.9 | Elongation MD (%) | 6 |

EXAMPLE 21

Sheet material, prepared as in Example 7 was washed with methyl ethyl ketone for 20 minutes to extract the polyethylene glycol. The sheet material was air dried while restrained. The Gurley value was 48 seconds/50 cc, significantly less than Example 7.

The present invention may be embodied in other specific forms without departing from its spirit or essential characteristics. The described embodiments are to be considered in all respects only as illustrative and not restrictive. All changes which come within the meaning and range of equivalency of the claims are to be embraced within the scope of the claims.

What is claimed is:

1. A microporous shaped article comprising ethylene-vinyl alcohol copolymer; said article being prepared by a) melt-blending the ethylene-vinyl alcohol copolymer and a compatible polymer or compound in which the copolymer will dissolve to form a solution at the melting temperature of the copolymer but which will phase separate on cooling at or below the crystallization temperature of the copolymer, b) forming a shaped article of the melt-blended mixture, c) cooling the shaped article to cause phase separation of the compatible polymer or compound from the ethylene-vinyl alcohol copolymer, and d) stretching the shaped article in at least one direction; and said article comprising a multiplicity of randomly dispersed, non uniformly shaped particles of ethylene-vinyl alcohol copolymer joined together by fibrils formed during stretching of the article.

2. The article of claim 1 wherein the ethylene-vinyl alcohol copolymers are random, block or graft copolymers.

3. The article of claim 1 wherein said ethylene-vinyl alcohol copolymer has and ethylene unit content of about 20 to 90 mol percent.

4. The article of claim 1 wherein said ethylene-vinyl alcohol copolymer has a degree of saponification of at least about 80 mol percent based on the vinyl alcohol units in the copolymer.

5. The article of claim 5 further comprising up to about 15 mol percent of copolymerizable monomer.

6. The article of claim 5 wherein said copolymerizable monomer is methacrylic acid, vinyl chloride, methyl methacrylate, acrylonitrile or vinyl pyrrolidone.

7. The article of claim 1 wherein the functional hydroxyl groups of the vinyl alcohol units of said ethylene-vinyl alcohol copolymer are partially crosslinked with an aldehyde.

8. The article of claim 7 wherein said aldehyde is formaldehyde, acetaldehyde, butyraldehyde or benzaldehyde.

9. The article of claim 7 wherein said degree of crosslinking is not more than about 30 mol percent.

10. The article of claim 1 wherein said article is imbibed with a liquid, solvent solution, dispersion, or solid.

11. The article of claim 10 wherein said imbibed material is an isorefractive liquid, medicament, fragrance, antistatic agent, surfactant, dye, UV stabilizer, pesticide, polymer, activated carbon or a pigment.

12. The article of claim 1 wherein said article bears a coating.

13. The article of claim 1 wherein said article is laminated to another material.

14. The article of claim 13 wherein said other material is a polymeric or metallic film, a woven or knit fabric, a nonwoven web, paper or synthetic paper.

15. The article of claim 1 wherein an image receptor is coated on, or laminated to said article.

16. The article of claim 1 wherein a skin is present on at least one surface of said article.

17. The article of claim 16 wherein said skin is removable.

* * * * *

UNITED STATES PATENT AND TRADEMARK OFFICE
CERTIFICATE OF CORRECTION

PATENT NO.: 5,962,544

DATED: October 5, 1999

INVENTOR(S): Clinton P. Waller, Jr.

It is certified that error appears in the above-identified patent and that said Letters Patent is hereby corrected as shown below:

In Claim 5, first line, "5" should be replaced with --1--.

Signed and Sealed this

Twentieth Day of March, 2001

Attest:

NICHOLAS P. GODICI

Attesting Officer

Acting Director of the United States Patent and Trademark Office